US006891526B2

(12) United States Patent
Gombert et al.

(10) Patent No.: US 6,891,526 B2
(45) Date of Patent: May 10, 2005

(54) INPUT DEVICE FOR COMMANDING CONTROL OPERATIONS OF A REAL AND VIRTUAL OBJECT

(75) Inventors: Bernd Gombert, Grafrath (DE); Johanndes Dietrich, Gilching (DE); Volker Senft, Seefeld (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 255 days.

(21) Appl. No.: 09/883,361

(22) Filed: Jun. 19, 2001

(65) Prior Publication Data

US 2001/0053942 A1 Dec. 20, 2001

(30) Foreign Application Priority Data

Jun. 19, 2000  (DE) ........................................ 100 29 173

(51) Int. Cl.[7] ................................................ G09G 5/00
(52) U.S. Cl. ........................................ 345/156; 700/85
(58) Field of Search ................................ 345/156, 158, 345/161; 700/83–85, 900; 74/471 XY, 469; 463/36, 37

(56) References Cited

U.S. PATENT DOCUMENTS

| 4,763,531 | A |   | 8/1988  | Dietrich et al. |
| 4,785,180 | A |   | 11/1988 | Dietrich et al. |
| 5,222,400 | A | * | 6/1993  | Hilton .................... 73/862.043 |
| 5,589,828 | A | * | 12/1996 | Armstrong ................... 341/20 |
| 5,703,623 | A | * | 12/1997 | Hall et al. .................. 345/158 |
| 5,757,360 | A |   | 5/1998  | Nitta et al. |
| 5,859,372 | A | * | 1/1999  | Neltoft ................... 73/862.043 |
| 5,923,318 | A | * | 7/1999  | Zhai et al. ................... 345/157 |
| 6,072,467 | A | * | 6/2000  | Walker ....................... 345/157 |

FOREIGN PATENT DOCUMENTS

DE        199 37 307        2/2000

* cited by examiner

Primary Examiner—Alexander Eisen
(74) Attorney, Agent, or Firm—Browdy and Neimark, P.L.L.C.

(57) ABSTRACT

A manually actuated input device for commanding machine- and/or computer-assisted control operations for kinematic motions of a real or virtual multipart object, including a force/moment sensor with which linear displacements in the form of translational movements in the direction of three axes (X, Y, Z), each standing perpendicular on the other, of a three-dimensional rectangular system of coordinates and/ or rotational excursions in the form of rotational motions (A, B, C) about these three axes are sensed and converted into commanded motions of the object to be controlled is char- acterized by the commanded individual linear displacements and/or rotational excursions of the force/moment sensor being assigned specific kinematic motion patterns of parts of the real or virtual object thereby permitting manipulation or animation thereof as a transforming interlink and by the commanded velocities of the corresponding individual lin- ear displacements and/or rotational excursions of the force/ moment sensor being additionally weightable as a kinematic interlink assignment. The invention can be put to use e.g. in kinematic animation operations of human-like robots, fig- ures or virtual animate beings.

26 Claims, 11 Drawing Sheets

INPUT DEVICE FOR COMMANDING CONTROL OPERATIONS OF A REAL AND VIRTUAL OBJECT

BACKGROUND DESCRIPTION

1. Field of the Invention

The invention relates to a manually actuated input device for commanding machine- and/or computer-assisted control operations for kinematic motions of a real or virtual multi-part object, including a force/moment sensor with which linear displacements in the form of translational movements in the direction of three axes, each standing perpendicular on the other, of a three-dimensional rectangular system of coordinates and/or rotational excursions in the form of rotational motions about these three axes are sensed and converted into commanded motions of the object to be controlled.

In addition, the invention relates to possible applications of the input device.

2. Prior Art

Such force/moment sensors are known, for example from U.S. Pat. No. 4,763,531 and U.S. Pat. No. 4,785,180. With the aid of one such force/moment sensor, accommodated in an input device, linear displacements and/or rotational excursions, i.e. three translational movements in the direction of three axes (X, Y, Z), each standing perpendicular on the other, of a three-dimensional rectangular system of coordinates and three rotational motions about these three axes, can be sensed and directly converted into commanded translational and rotational motions or velocities of the complete object to be controlled, e.g. for the control of automated and robotic, manipulator or similar systems as well as 3D computer graphics.

Modern computers are becoming increasingly more sophisticated in implementing complex real-time 3D motional control, requiring manipulation of the motions and possibly changing the sounds associated therewith to be controlled in accordance with human appreciation.

Known in this context from U.S. Pat. No. 5,757,360 A is a manually actuated input device for controlling a virtual object in a computer display. In this arrangement, the object itself can be moved in accordance with the movement of the egg-shaped manual input device, or dedicated motion patterns of the input device can be caused to action parts of the virtual object. The input device used for this purpose is based on the principle of an accelerometer which recognizes accelerations and patterns thereof from the motions implemented in predefined patterns of the complete manual input device in allocating a motion characteristic assigned to each acceleration or pattern to the object shown in the display. In this known input device provided only for controlling and animating virtual, but not real, objects, i.e. robots and figures, difficulties are encountered, however, in correctly implementing a manual movement assigned to a specific, desired acceleration pattern, especially when the object needs to be animated in a wealth of different variants. This is due to the motion of egg-shaped input device having no fixed reference base in free space for precise guidance and because only acceleration reactions are evaluated. Accordingly, this known input device fails to achieve animation of the virtual object with high diversification due to its low targetting accuracy, and thus the animation is lacking in realistic and natural presentation.

SUMMARY OF THE INVENTION

The invention is based on the objective of sophisticating an input device of the aforementioned kind so that defined and intuitive implementation of kinematic control and animation operations of objects is possible. The objects to be controlled or animated are intended to be more particularly human-like robots or computerized virtual animate beings, whilst achieving high target accuracy of each of a wealth of desired control or animation variants.

In accordance with the invention, relating to an input device of the aforementioned kind, this objective is achieved in that the commanded individual linear displacements and/or rotational excursions of the force/moment sensor are assigned specific kinematic motion patterns of parts of the real or virtual object thereby permitting manipulation or animation thereof as a transforming interlink and in that the commanded velocities of the corresponding individual linear displacements and/or rotational excursions of the force/moment sensor are additionally weightable as a kinematic interlink assignment. In this arrangement the individual motions of the kinematics to be controlled are transformed similar to the way in which a player manipulates a puppet.

Advantageous applications of the input device in accordance with the invention involve machine- or computer-controlled objects simulated by inherently and/or totally movable objects or animate beings, whereby parts of the object or animate being, e.g. the arms, legs, trunk and head of an animate being, simulated in each case, form the parts of the object to be controlled as regards their kinematics. Its use for computer-controlled animation operations of the objects is also expedient.

Since the input device in accordance with the invention permits simultaneous control of up to six degrees of freedom, motions and animations of machine- and/or computer-controlled simulated animate beings or objects are represented highly realistically and naturally.

Since for six degrees of freedom there are twelve major directions of motion, to each of which an interlinking assignment can be allocated, these major directions of motion can be additionally sub-related by rates and/or positions so that for two rates and/or positions 24 kinematic assignments would already be possible. For three rates and/or positions this would be 36 kinematic assignments, etc.

The input device in accordance with the invention is not only solely applicable to controlling the motions of parts of the object. Instead, in addition to controlling the motions of parts of the object it is possible to advantage to combine and/or vary tones and/or music of any kind. This would mean, for example, that when the operator is controlling a higher velocity of the input device, tones such as e.g. walking noises or music sequences sound and/or change in thus enabling friction sounds or also dramatic music sequences to be combined with the motional control in effectively enhancing the reality and naturalness.

The configuration for achieving one particularly advantageous input device including a force/moment sensor is set forth in claim 7 and in the claims 8 to 18 relating back thereto directly or indirectly. These or similar force/moment sensors are known, for example, from U.S. Pat. No. 4,763,531 or U.S. Pat. No. 4,785,180. With the aid of one such force/moment sensor accommodated in an input device, linear displacements or rotational excursions, as may be generated e.g. by the human hand in the form of forces and moments, can be sensed and directly converted into translational and rotational motions or velocities of an object to be controlled.

Since the invention in making use of a force/moment sensor, e.g. of the aforementioned kind, relates to an analog senso-haptic input device, combining e.g. an 8-bit sensor resolution of 512 (±256) rates and 512 (±256) changes in tone/sound with the motional control, it permits achieving a wealth of possible combinations.

BRIEF DESCRIPTION OF THE DRAWINGS

The invention will now be detained with reference to the attached drawings in which.

DETAILED DESCRIPTION

Figure 1:
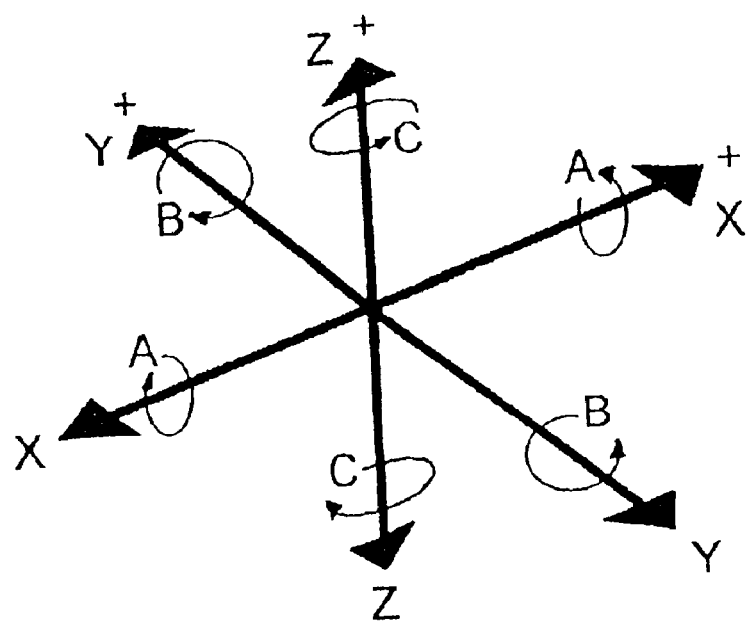
FIG. 1 is an inclined view of six possible motional components of a force/moment sensor used in the input device in accordance with the invention.

Referring now to FIG. 1 there is illustrated how six possible motional components can be sensed by an input device. The input device, as shown by way of example in FIGS. 21 and 22, including a force/moment sensor, is capable of sensing these motional directions in sensing all linear displacements and rotational excursions as may be generated by the human hand in the form of forces and moments for implementing control of an object and/or parts thereof.

Figure 21:
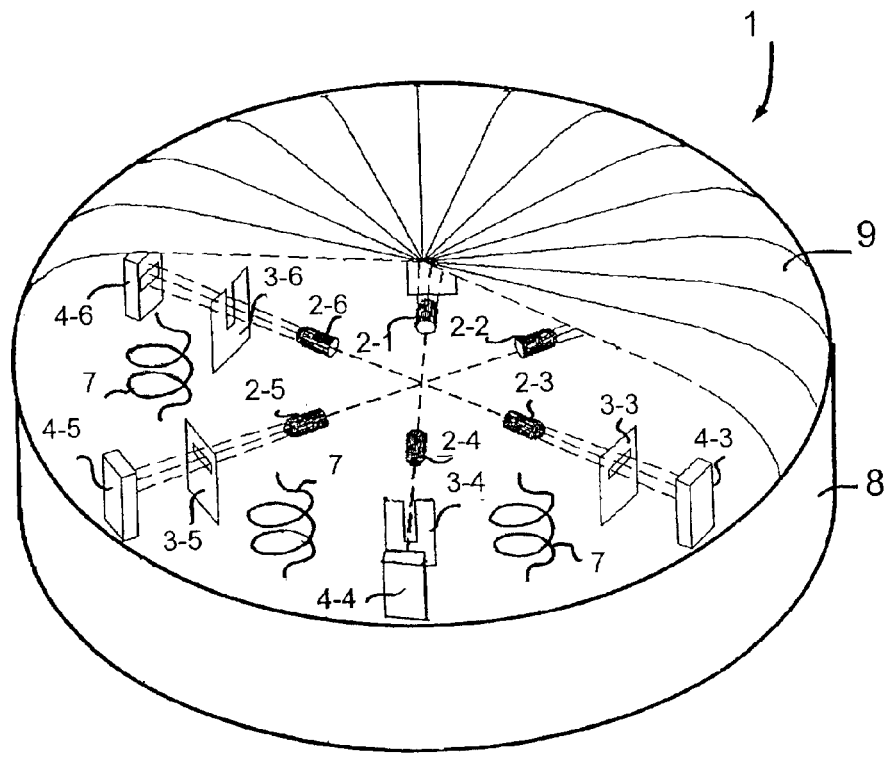
FIG. 21 is a diagrammatic illustration of an input device containing an optoelectronic force/moment sensor including a manual control cap shown cut open in part.
Figure 22:
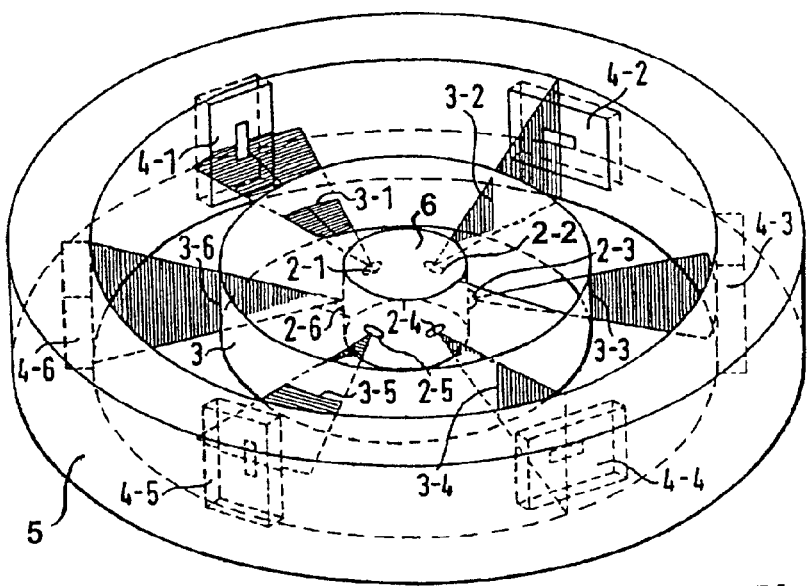
FIG. 22 is a diagrammatic illustration of the optoelectronic assembly accommodated in the input device as shown in FIG. 21.

The possible linear displacements run in both directions of the three axes X, Y and Z of a three-dimensional, rectangular system of coordinates each indicated by double arrows, whilst the rotational excursions, i.e. the moment vectors A, B and C generated about each coordinate axis X, Y and Z are indicated by arrowed sectors. The forces and moments measured by the input device, e.g. that as shown in FIGS. 21 and 22 are directly converted into translational and rotational motions and velocities of the individual machine- or computer-controlled parts of the object.

Referring now to FIGS. 2 to 20 there are illustrated diagrammatically by way of pictograms how various conceivable assignments between motions of a force/moment sensor and motions of a simulated human are achievable involving the directions as shown in FIG. 1. The force/moment sensor used for this purpose may be, more particularly, one such force/moment sensor as shown in FIGS. 21 and 22 which will now be described with reference thereto.

Figure 2:
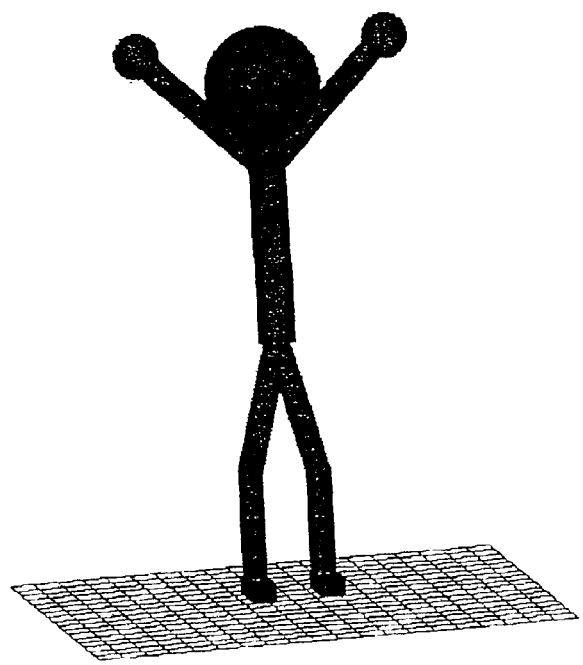
FIGS. 2 to 20 are diagrammatic illustrations of various assignments between motions of a force/moment sensor and motions of a simulated human.

Slowly pulling up the grip control cap (8 in FIG. 21) from its starting position, i.e. a slow movement in the positive Z direction, results in up and down movement of the arms (=parts of the object), as indicated by the pictogram representing a human (=object) in FIG. 2.

Figure 3:
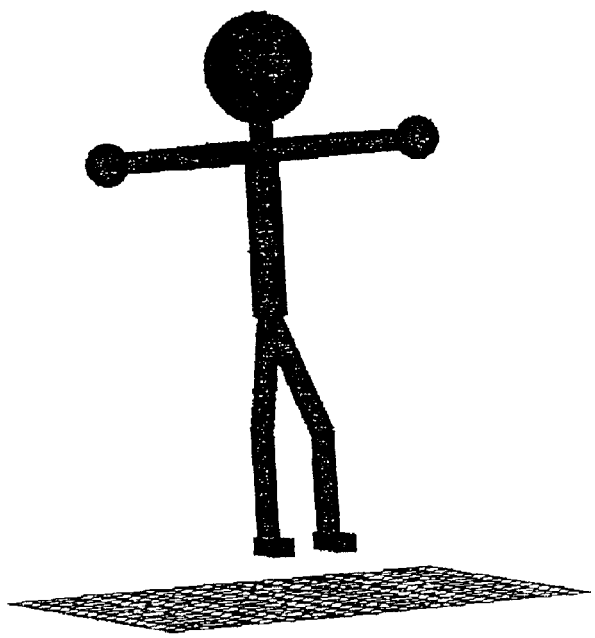
Figure 4:
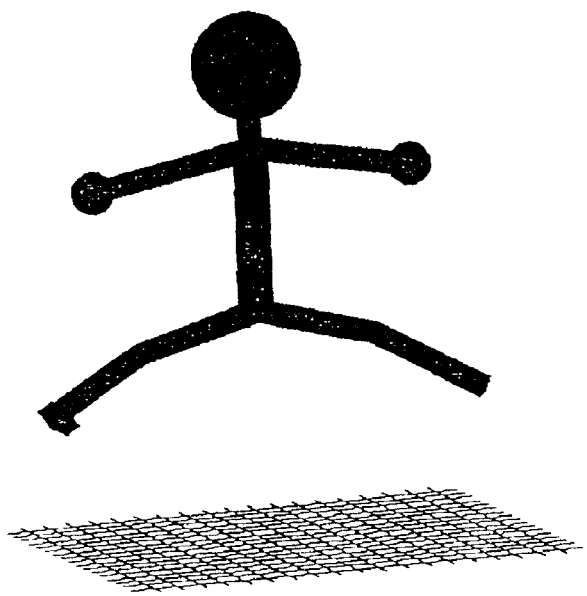

Quickly pulling up the grip control cap (8 in FIG. 21) from its starting position, i.e. a quick movement in the positive Z direction, results in the object jumping with suitable movement of the arms and legs, as indicated by the pictogram representing a human in FIGS. 3 and 4.

Figure 5:
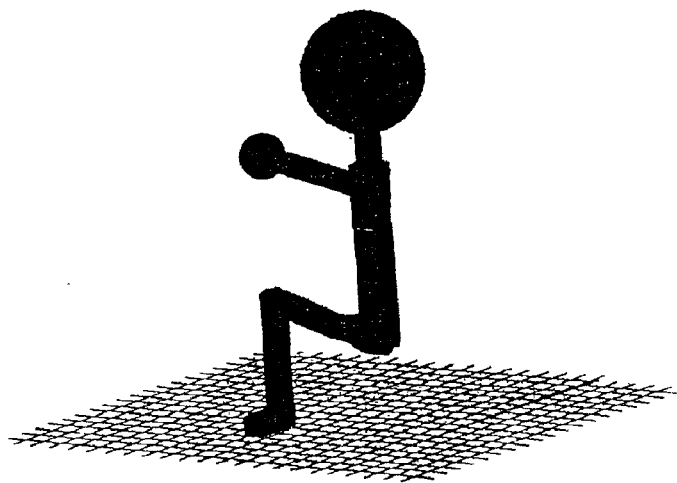

Slowly depressing the grip control cap (8 in FIG. 21) from its starting position, i.e. a slow movement in the negative Z direction, results in the object assuming a seating position with suitable movement of the parts of the body, as indicated by the pictogram representing a human in FIG. 5.

Figure 6:
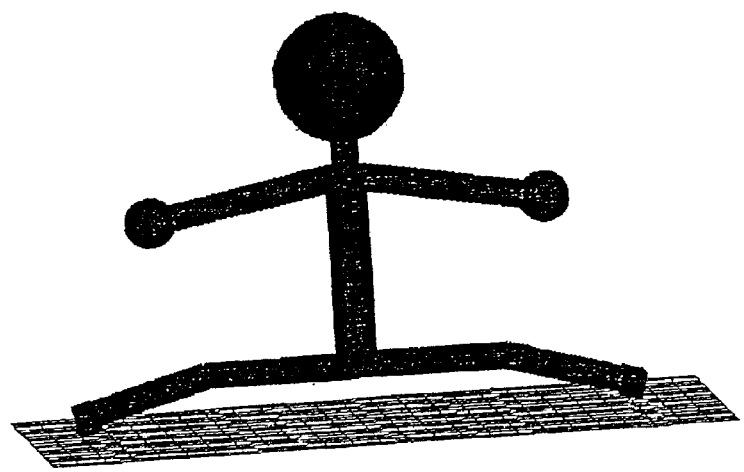

Quickly depressing the grip control cap (8 in FIG. 21) from its starting position, i.e. a quick movement in the negative Z direction, results in the object doing the splits with suitable movement of the parts of the body, as indicated by the pictogram representing a human in FIG. 6.

Figure 7:
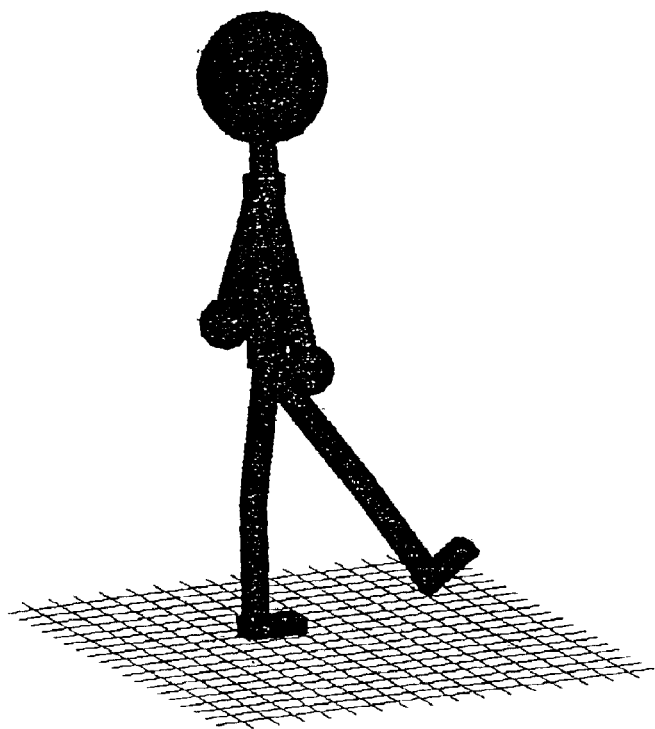

Slowly shifting the grip control cap (8 in FIG. 21) forwards from its starting position, i.e. a slow movement in the positive Y direction, results in the object walking forwards with suitable movement of the parts of the body, as indicated by the pictogram representing a human in FIG. 7.

Figure 8:
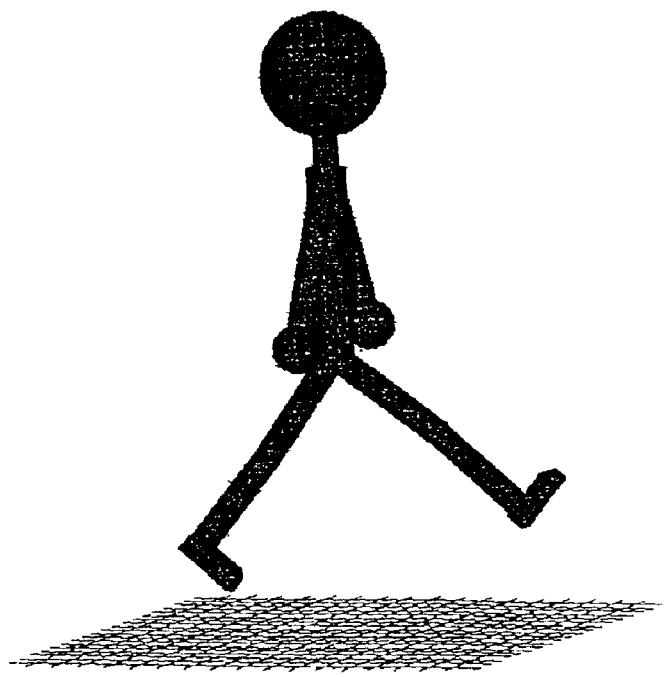

Quickly shifting the grip control cap (8 in FIG. 21) forwards from its starting position, i.e. a quick movement in the positive Y direction, results in the object running forwards with suitable movement of the parts of the body, as indicated by the pictogram representing a human in FIG. 8.

Figure 9:
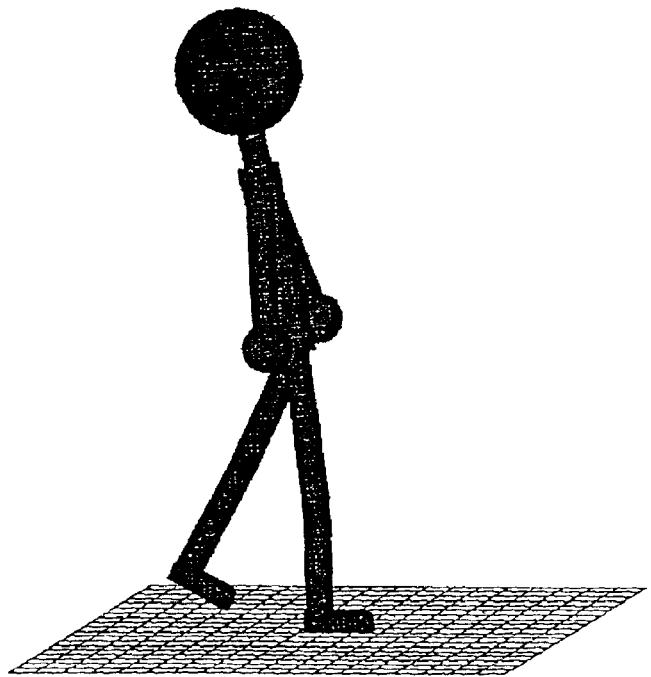

Slowly shifting the grip control cap (8 in FIG. 21) backwards from its starting position, i.e. a slow movement in the negative Y direction, results in the object walking backwards with suitable movement of the parts of the body, as indicated by the pictogram representing a human in FIG. 9.

Quickly shifting the grip control cap (8 in FIG. 21) backwards from its starting position, i.e. a quick movement in the negative Y direction, results in the object running backwards with suitable movement of the parts of the body. The pictogram in this case (not shown) is similar to that as shown in FIG. 9, although, of course, the movement sequence would be quicker.

Figure 10:
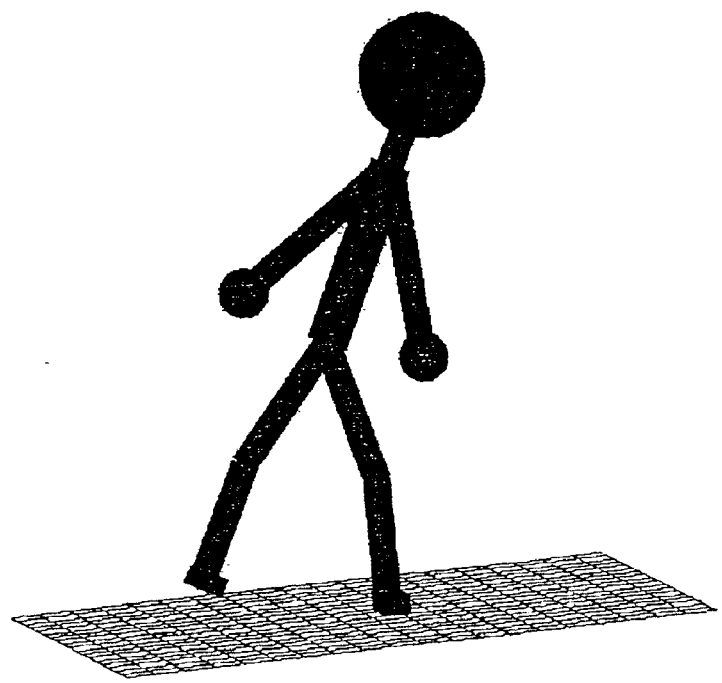

Slowly shifting the grip control cap (8 in FIG. 21) to the right from its starting position, i.e. a slow movement in the positive X direction, results in the object side-stepping to the right with suitable movement of the parts of the body, as indicated by the pictogram representing a human in FIG. 10.

Figure 11:
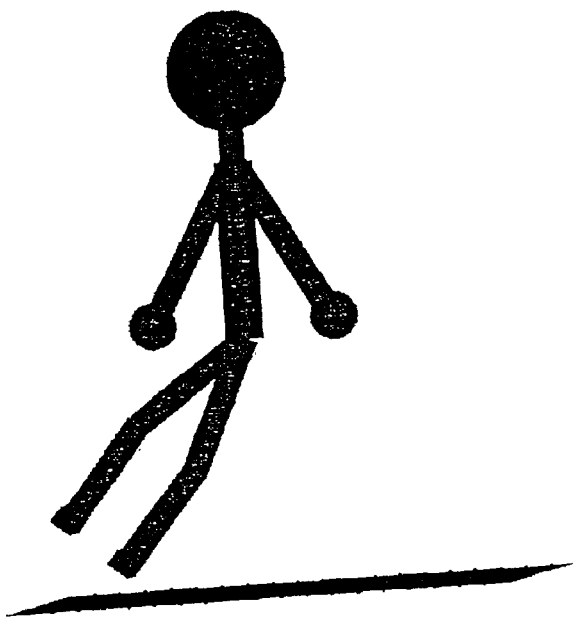

Quickly shifting the grip control cap (8 in FIG. 21) to the right from its starting position, i.e. a quick movement in the positive X direction, results in the object jumping to the right with suitable movement of the parts of the body, as indicated by the pictogram representing a human in FIG. 11.

Figure 12:
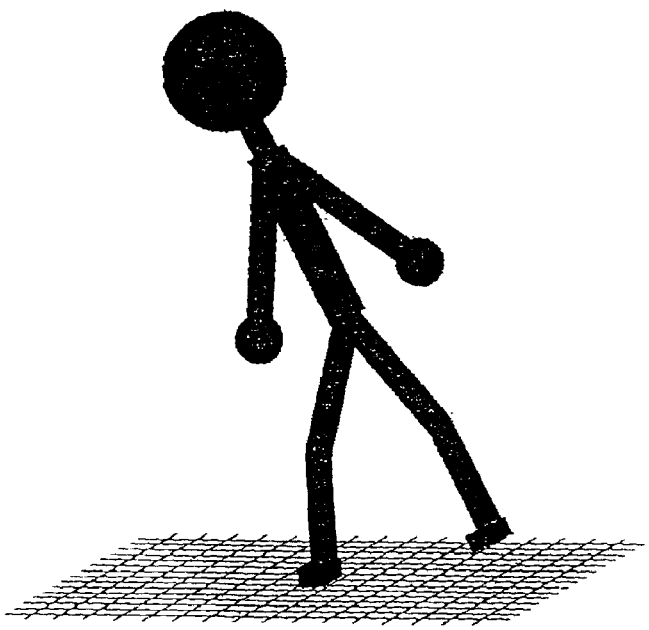

Slowly shifting the grip control cap (8 in FIG. 21) to the left from its starting position, i.e. a slow movement in the negative X direction, results in the object sidestepping to the left with suitable movement of the parts of the body, as indicated by the pictogram representing a human in FIG. 12.

Figure 13:
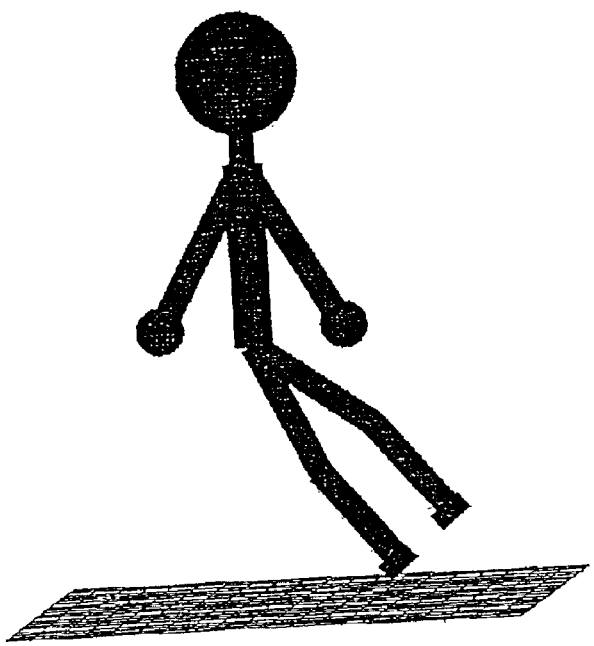

Quickly shifting the grip control cap (8 in FIG. 21) to the left from its starting position, i.e. a quick movement in the negative X direction, results in the object jumping to the left with suitable movement of the parts of the body, as indicated by the pictogram representing a human in FIG. 13.

Figure 14:
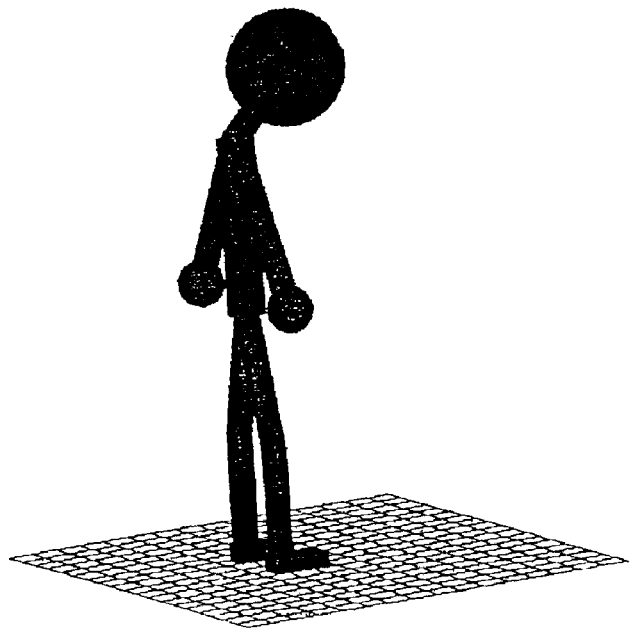

Slowly turning the grip control cap transversely to its running direction, i.e. a slow positive turn about the X direction, results in the head of the object nodding down, as indicated by the pictogram representing a human in FIG. 14.

Figure 15:
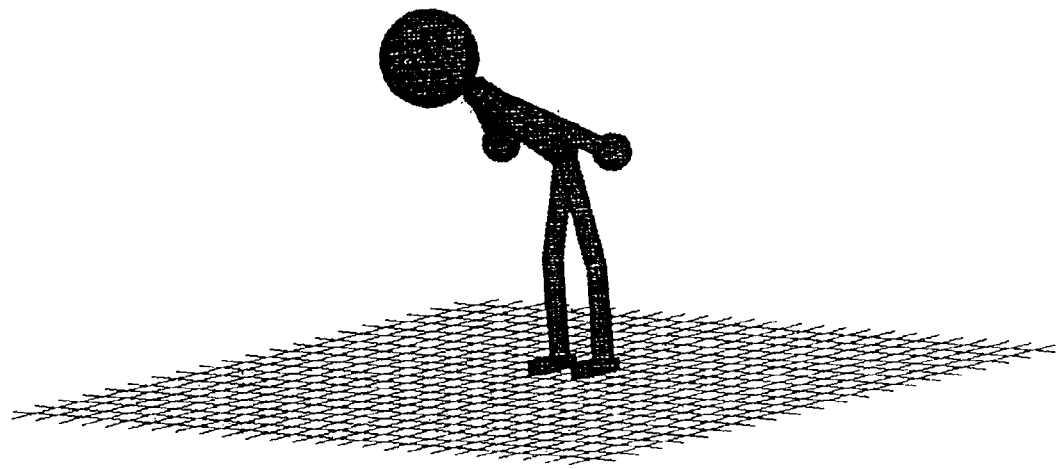

Quickly turning the grip control cap transversely to its running direction, i.e. a quick positive turn about the X direction, results in the object making a bow, as indicated by the pictogram representing a human in FIG. 15.

Figure 16:
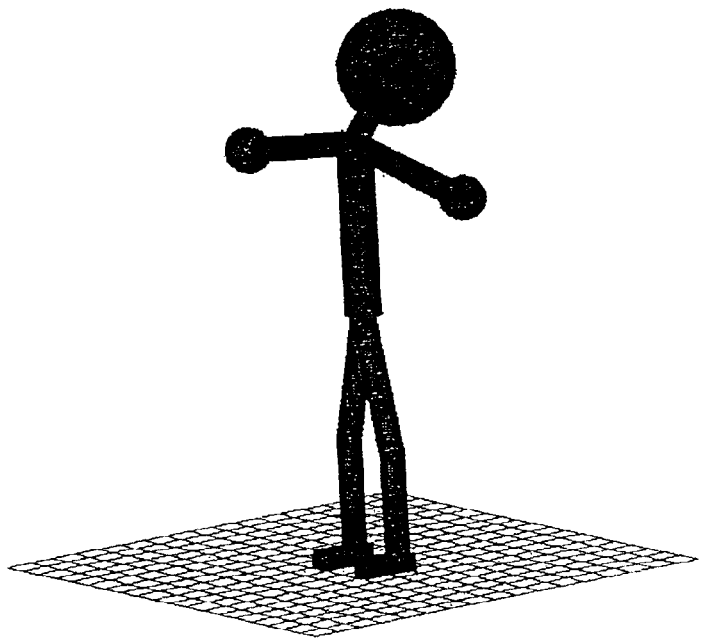

Slowly turning the grip control cap transversely to its running direction, i.e. a slow negative turn about the X direction, results in the head of the object nodding upwards, as indicated by the pictogram representing a human in FIG. 16.

Figure 17:
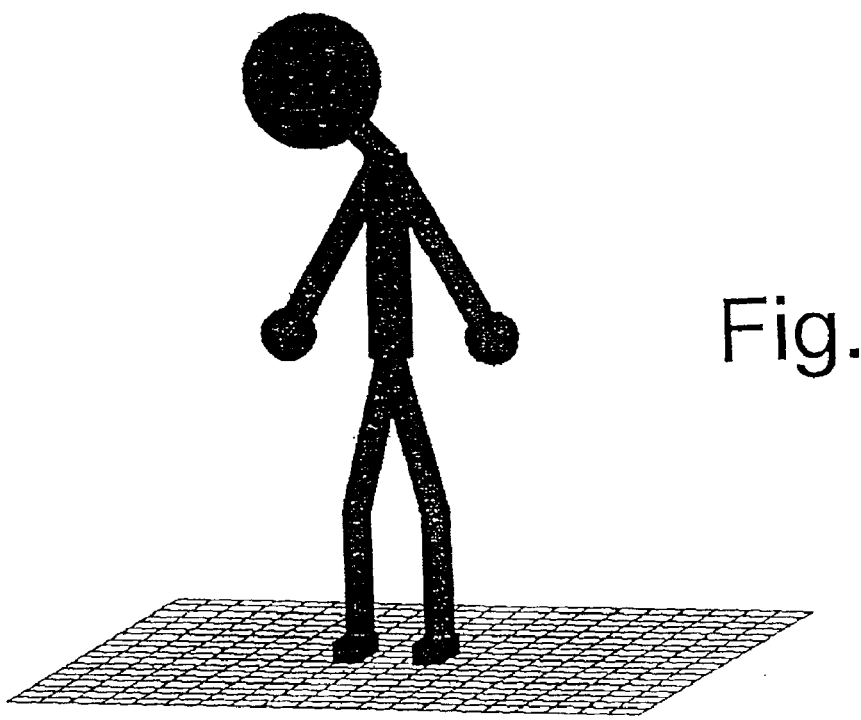

Slowly turning the grip control cap about its running direction, i.e. a slow positive turn about the Y direction, results in the head of the object nodding to the right, as indicated by the pictogram representing a human in FIG. 17.

Figure 18:
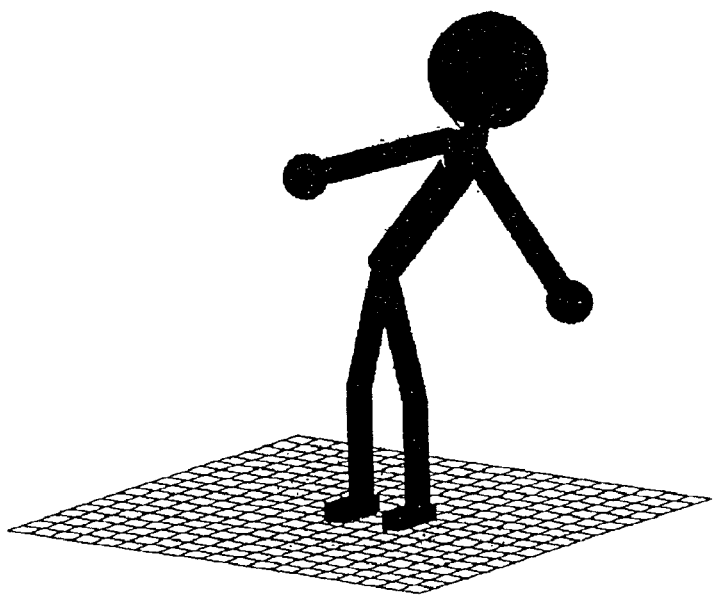

Quickly turning the grip control cap about its running direction, i.e. a quick positive turn about the Y direction, results in the object swaying to the right, as indicated by the pictogram representing a human in FIG. 18.

Figure 19:
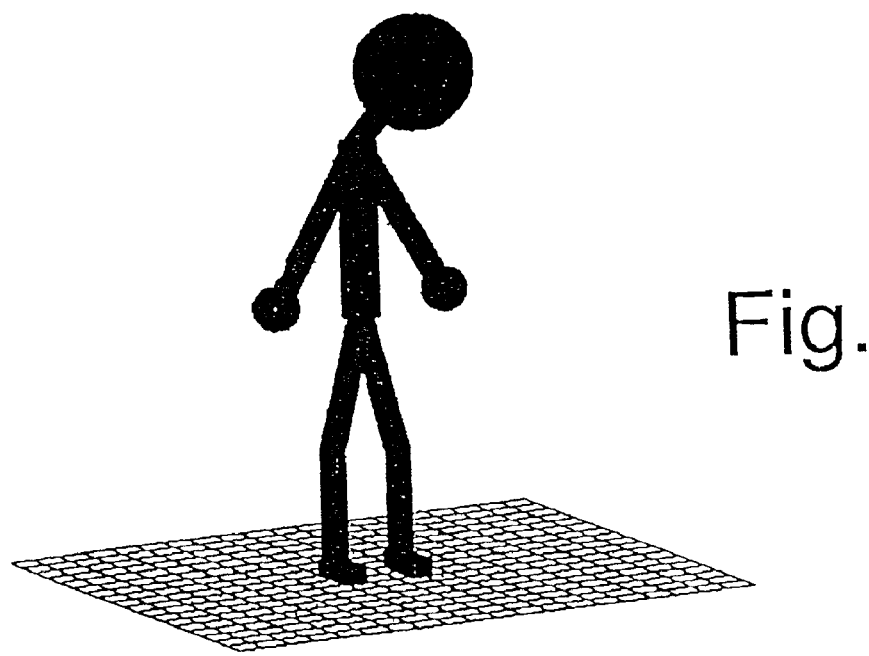

Slowly turning the grip control cap about its running direction, i.e. a slow negative turn about the Y direction, results in the head of the object nodding to the left, as indicated by the pictogram representing a human in FIG. 19.

Figure 20:
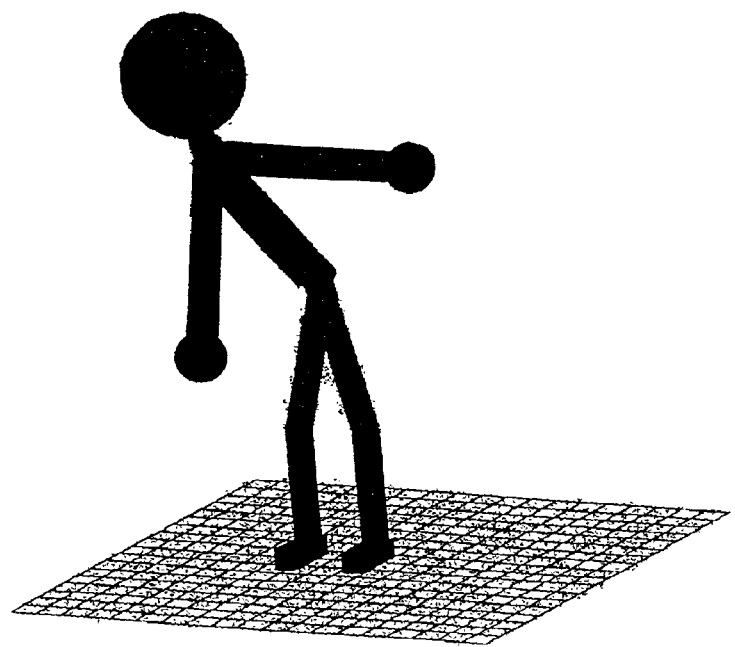

Quickly turning the grip control cap about its running direction, i.e. a quick negative turn about the Y direction, results in the object swaying to the left, as indicated by the pictogram representing a human in FIG. 20.

Slowly turning the grip control cap about the body axis of the object, i.e. a slow positive turn about the Z direction, results in the object twisting to the right. Quickly turning the grip control cap about the body axis of the object, i.e. a quick positive turn about the Z direction, results in the object making a twisting jump to the right. Slowly turning the grip control cap about the body axis of the object, i.e. a slow negative turn about the z direction, results in the object twisting to the left.

Quickly turning the grip control cap about the body axis of the object, i.e. a quick positive turn about the Z direction, results in the object making a twisting jump to the left. No pictograms of a human are included in depicting the last-mentioned movement actions.

Referring now to FIG. 21 there is illustrated an input device 1 including a force/moment sensor in the form of an optoelectronic assembly as shown in FIG. 22 diagrammatically. In FIG. 21 the input device 1 as shown therein comprises a circular cylindrical control cap 8 in the embodiment as shown, featuring a domed control surface 9, shown partly cut open in FIG. 21 to expose part of the configuration of a force/moment sensor in the form of the optoelectronic assembly as shown diagrammatically.

Arranged in the optoelectronic assembly as shown diagrammatically in FIG. 22 are six light-emitting means 2-1 to 2-6, preferably in the form of six light-emitting diodes in a single plane. Assigned to the light-emitting means 2-1 to 2-6 fixedly spaced away therefrom in each case is a slotted aperture 3-1 to 3-6. In this arrangement, the adjacent slotted apertures are configured in a cylindrical first ring 3 each offset 90° to the other relative to their major direction of extension so that, for example, the slotted aperture 3-1 is oriented horizontally and the two adjacent slotted apertures 3-2 and 3-6 are oriented vertically.

In the optoelectronic assembly as shown in FIG. 22 six position-sensing, photosensitive detectors 4-1 to 4-6 are arranged in a cylindrical second ring 5 correspondingly oriented as regards the assigned slotted apertures 3-1 to 3-6. The second ring 5 including the six position-sensing detectors 4-1 to 4-6 is furthermore fixedly secured to the inner side of the cylindrical control cap 8 of the input device 1.

Since the six light-emitting means 2-1 to 2-6 are accommodated in a supporting means 6 diagrammatically in FIG. 22 as a cylinder which is in turn arranged stationary in the input device 1, the second ring 5 including the attached six position-sensing detectors 4-1 to 4-6 fixedly secured to the control cap 8 is movable relative to the stationary arrangement of the six light-emitting means 2-1 to 2-6 and the slotted aperture first ring 3 fixedly assigned thereto.

In one practical embodiment, the stationary supporting means 6 indicated diagrammatically as a cylinder in FIG. 22 may also be configured as a stationary disk whose diameter roughly corresponds to the outer diameter of the second ring 5 mounting the position-sensing detectors 4-1 to 4-6 and which may be arranged above or below the second ring 5.

Provided between the second ring 5 mounting the position-sensing detectors 4-1 to 4-6 and one such disk-type supporting means are spring elements 7 (see FIG. 21) in the form of coil springs fixedly assigned via thru-bolts (not shown) to both the second ring 5 and the supporting means 6.

These coil springs 7 permit movement of the second ring 5 mounting the detectors 4-1 to 4-6 via the control cap 8 relative to the stationary assembly of the light-emitting diodes 2-1 to 2-6 and the slotted aperture first ring 3 fixedly assigned thereto in the direction of the three axes X, Y, Z of a rectangular three-dimensional system of coordinates (see FIG. 1) and about these three axes, and the return to the starting position each time after a linear displacement or rotational excursion.

The six light-emitting diodes 2-1 to 2-6 are arranged equally spaced from each other angularly, i.e. at an angle of 60° in a single plane and comprise the slotted apertures 3-1 to 3-6 oriented alternatingly horizontally and vertically to this plane. As evident from the location of the individual slotted apertures 3-1 to 3-6 and of the planes emanating from the individual diodes 2-1 to 2-6, as highlighted shaded, the axes of the individual position-sensing detectors 4-1 to 4-6 are always oriented perpendicular to the slotted apertures 3-1 to 3-6 assigned thereto.

The optoelectronic assembly permits total sensing of all six possible motional components, namely the three translational motions in the direction of the three axes X, Y and Z (see FIG. 1) of a rectangular three-dimensional system of coordinates and the three rotational motions A, B and C about these three axes X, Y and Z.

Since the control cap 8 is fixedly secured to the second ring 5 mounting the detectors 4-1 to 4-6 and this second ring 5 is springingly connected by means of the spring elements 7 (FIG. 21) to the stationary supporting means 6 mounting the six light-emitting means 2-1 to 2-6 and the slotted apertures 3-1 to 3-6 assigned thereto, the spring elements 7 maintain the complete measuring system in the mechanical zero position when no commands are applied to the control cap 8 by the operator.

In this arrangement, by varying the spring properties (more particularly their stiffness) the operational characteristic of the control cap 8 can be influenced within broad limits. When making use of relatively soft spring elements 7 the input device 1 has more the effect of a path-sensitive sensor, whilst when using harder spring elements 7 it is more suitable for making commands by exerting forces and moments.

Furthermore, each position-sensing detector in the optoelectronic assembly is assigned its own light source which is signalled by a simple electronic closed loop controller, with the aid of which, for example, any differences in the sensitivity of the detectors, LED efficiency, tolerances in the electronic components, as well as temperature drift, are all automatically and speedily compensated, thus eliminating the need for any additional calibration.

What is claimed is:

1. A manually actuated input device for commanding machine- and/or computer-assisted control operations for kinematic motions of a real or virtual multipart object, including a force/moment sensor with which linear displacements in the form of translational movements in the direction of three axes (X, Y, Z), each standing perpendicular on the other, of a three-dimensional rectangular system of coordinates and/or rotational excursions in the form of rotational motions (A, B. C) about these three axes are sensed and converted into commanded motions of the object to be controlled wherein the commanded individual linear displacements and/or rotational excursions of the force/moment sensor are assigned specific kinematic motion patterns of parts of the real or virtual object thereby permitting manipulation or animation thereof as a transforming interlink and in that the commanded velocities of the corresponding individual linear displacements and/or rotational excursions of the force/moment sensor are additionally weightable as a kinematic interlink assignment.

2. The input device as set forth in claim 1 wherein for six degrees of freedom there are twelve major directions of motion and thus a total of twelve kinematic interlinking assignments of the parts of the object which are additionally sub-related by rates and/or positions so that for a total of two rates and/or positions 24 kinematic interlinking assignments of the parts of the object are possible, and for a total of three rates and/or positions 36 kinematic interlinking assignments of the parts of the object are possible.

3. The input device as set forth in claim 1 wherein, in addition to controlling the motions of parts of said object, tones and/or music of any kind are assigned to the commanded individual linear displacements and/or rotational excursions of the force/moment sensor in any kind of combination and/or variation.

4. The input device as set forth in claim 2 wherein, in addition to controlling the motions of parts of said object, tones and/or music of any kind are assigned to the commanded individual linear displacements and/or rotational excursions of the force/moment sensor in any kind of combination and/or variation.

5. The input device as set forth in claim 3 wherein higher velocities of linear displacements and/or rotational excursions of the force/moment sensor are assigned sounding and/or changing tones.

6. The input device as set forth in claim 4 wherein higher velocities of linear displacements and/or rotational excursions of the force/moment sensor are assigned sounding and/or changing tones.

7. The input device as set forth claim 1 wherein an optoelectronic assembly for simultaneously entering six components (X, Y, Z; A, B, C) in or about said three axes (X, Y, Z) of a rectangular three-dimensional system of coordinates is provided as said force/moment sensor, in which each of at least six light-emitting means (2-1 to 2-6) mounted equally angularly spaced from the other, each including an inputting, fixedly arranged slotted aperture (3-1 to 3-6), is arranged relative to each position-sensing detectors (4-1 to 4-6) oriented by its detector axis perpendicular to said slot directly of each assigned slotted apertures (3-1 to 3-6) so that said light-emitting means (2-1 to 2-6) including said assigned slotted apertures (3-1 to 3-6) and said position-sensing detectors (4-1 to 4-6) are moveable relative to each other.

8. The input device as set forth in claim 7 wherein six light-emitting means (2-1 to 2-6) each including a slotted aperture (3-1 to 3-6) at a fixed input spacing are provided stationary, each adjacent slotted aperture is configured offset 90° to the other relative to their major direction of extension and six position-sensing detectors (4-1 to 4-6) movable mutually relative to said slotted apertures (3-1 to 3-6) are provided, the detector axis of each of which is oriented perpendicular to the slot direction of each assigned slotted aperture (3-1 to 3-6).

9. The input device as set forth in claim 7 wherein each light-emitting means (2-1 to 2-6) assigned to each position-sensing detector (4-1 to 4-6) is signalled by an electronic closed loop controller which maintains the sum of the two currents flowing in the corresponding position-sensing detector (4-1 to 4-6) constant to a value which is the same for all of said at least six systems in controlling the beam intensity of said light-emitting means (2-1 to 2-6).

10. The input device as set forth in claim 8 wherein each light-emitting means (2-1 to 2-6) assigned to each position-sensing detector (4-1 to 4-6) is signalled by an electronic closed loop controller which maintains the sum of the two currents flowing in the corresponding position-sensing detector (4-1 to 4-6) constant to a value which is the same for all of said at least six systems in controlling the beam intensity of said light-emitting means (2-1 to 2-6).

11. The input device as set forth in claim 7 wherein said position-sensing detectors (4-1 to 4-6) are arranged correspondingly oriented on the inner side of a second cylindrical ring (5) fixedly secured to the inner side of a control cap 8 configurable as a handle and which is moveable via spring elements (7) provided between said second ring (5) and a supporting means (6) mounting in the middle said light-emitting means (2-1 to 2-6) relative to the stationary input device of said at least six light-emitting means (2-1 to 2-6) and said at least six slotted apertures (3-1 to 3-6), each assigned thereto, so that said second ring (5) is always returned to its starting position.

12. The input device as set forth in claim 8 wherein said position-sensing detectors (4-1 to 4-6) are arranged correspondingly oriented on the inner side of a second cylindrical ring (5) fixedly secured to the inner side of a control cap 8 configurable as a handle and which is moveable via spring elements (7) provided between said second ring (5) and a supporting means (6) mounting in the middle said light-emitting means (2-1 to 2-6) relative to the stationary input device of said at least six light-emitting means (2-1 to 2-6) and said at least six slotted apertures (3-1 to 3-6), each assigned thereto, so that said second ring (5) is always returned to its starting position.

13. The input device as set forth in claim 9 wherein said position-sensing detectors (4-1 to 4-6) are arranged correspondingly oriented on the inner side of a second cylindrical ring (5) fixedly secured to the inner side of a control cap 8 configurable as a handle and which is moveable via spring elements (7) provided between said second ring (5) and a supporting means (6) mounting in the middle said light-emitting means (2-1 to 2-6) relative to the stationary input device of said at least six light-emitting means (2-1 to 2-6) and said at least six slotted apertures (3-1 to 3-6), each assigned thereto, so that said second ring (5) is always returned to its starting position.

14. The input device as set forth in claim 7 wherein said at least six light-emitting means (2-1 to 2-6) are accommodated in a supporting means (6) to which a first cylindrical ring (3) is fixedly secured in which slotted apertures (3-1 to 3-6) are provided in the same angular spacing as that of said light-emitting means (2-1 to 2-6) mounted by said supporting means (6) and opposite to the latter are alternatingly each offset 90° to the other relative to their major direction of extension.

15. The input device as set forth in claim 8 wherein said at least six light-emitting means (2-1 to 2-6) are accommodated in a supporting means (6) to which a first cylindrical ring (3) is fixedly secured in which slotted apertures (3-1 to 3-6)are provided in the same angular spacing as that of said light-emitting means (2-1 to 2-6) mounted by said supporting means (6) and opposite to the latter are alternatingly each offset 90° to the other relative to their major direction of extension.

16. The input device as set forth in claim 9 wherein said at least six light-emitting means (2-1 to 2-6) are accommodated in a supporting means (6) to which a first cylindrical ring (3) is fixedly secured in which slotted apertures (3-1 to 3-6) are provided in the same angular spacing as that of said light-emitting means (2-1 to 2-6) mounted by said supporting means (6) and opposite to the latter are alternatingly each offset 90° to the other relative to their major direction of extension.

17. The input device as set forth in claim 10 wherein said at least six light-emitting means (2-1 to 2-6) are accommodated in a supporting means (6) to which a first cylindrical ring (3) is fixedly secured in which slotted apertures (3-1 to 3-6) are provided in the same angular spacing as that of said light-emitting means (2-1 to 2-6) mounted by said supporting means (6) and opposite to the latter are alternatingly each offset 90° to the other relative to their major direction of extension.

18. The input device as set forth in claim 11 wherein said at least six light-emitting means (2-1 to 2-6) are accommodated in a supporting means (6) to which a first cylindrical ring (3) is fixedly secured in which slotted apertures (3-1 to 3-6) are provided in the same angular spacing as that of said light-emitting means (2-1 to 2-6) mounted by said supporting means (6) and opposite to the latter are alternatingly each offset 90° to the other relative to their major direction of extension.

19. A method of controlling a machine- or computer-controllable object simulating an object or animate being, the object having a plurality of individually movable parts and the computer-controllable object moves as a whole or at least one part of the computer-controllable object moves with respect at least one other part, using the input device of claim 1, said method comprising manually operating said input device in order to control the kinematics of at least one of the parts of the object.

20. The method of claim 19 wherein the computer-controllable object simulates an animate being and the parts of the simulated animate being include arms, legs, a trunk and a head.

21. A method of controlling a machine- or computer-controllable object simulating an object or animate being, the object having a plurality of individually movable parts and the computer-controllable object moves as a whole or at least one part of the computer-controllable object moves with respect at least one other part, using the input device of claim 2, said method comprising manually operating said input device in order to control the kinematics of at least one of the parts of the abject.

22. The method of claim 21 wherein the computer-controllable object simulates an animate being and the parts of the simulated animate being include arms, legs, a trunk and a head.

23. A method of controlling a machine- or computer-controllable object simulating an object or animate being, the object having a plurality of individually movable parts and the computer-controllable object moves as a whole or at least one part of the computer-controllable object moves with respect to at least one other part, using the input device of claim 3, said method comprising manually operating said input device in order to control the kinematics of at least one of the parts of the object.

24. The method of claim 23 wherein the computer-controllable object simulates an animate being and the parts of the simulated animate being include arms, legs, a trunk and a head.

25. A method of controlling a machine- or computer-controllable object simulating an object or animate being, the object having a plurality of individually movable parts and the computer-controllable object moves as a whole or at least one part of the computer-controllable object moves with respect to at least one other part, using the input device of claim 4, said method comprising manually operating said input device in order to control the kinematics of at least one of the parts of the object.

26. The method of claim 25 wherein the computer-controllable object simulates an animate being and the parts of the simulated animate being include arms, legs, a trunk and a head.

* * * * *